Oct. 9, 1962 M. S. CLOUGH 3,056,992
DUST PAN
Filed Jan. 2, 1962 2 Sheets-Sheet 1
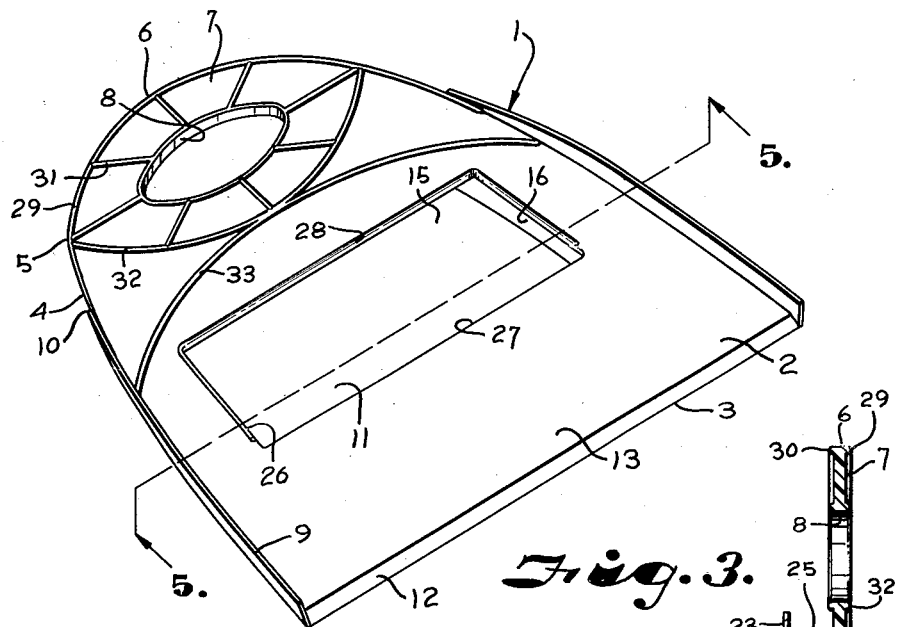
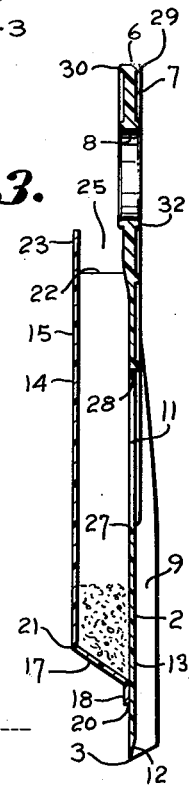
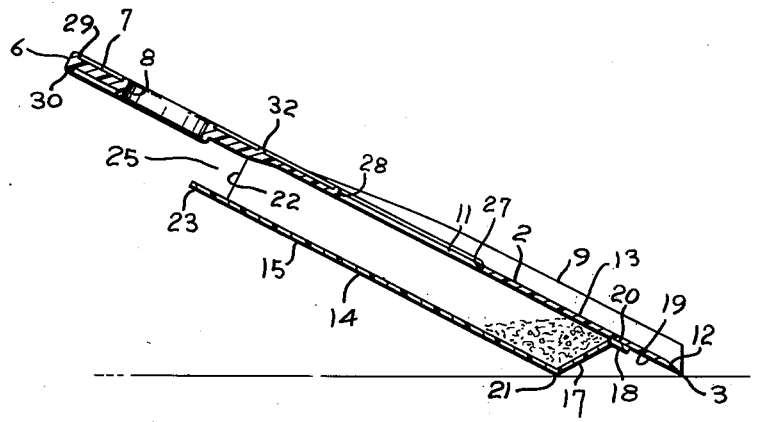
INVENTOR.
MINNIE S. CLOUGH
BY
*Fishburn and Gold*
ATTORNEYS

Oct. 9, 1962 M. S. CLOUGH 3,056,992
DUST PAN
Filed Jan. 2, 1962 2 Sheets-Sheet 2
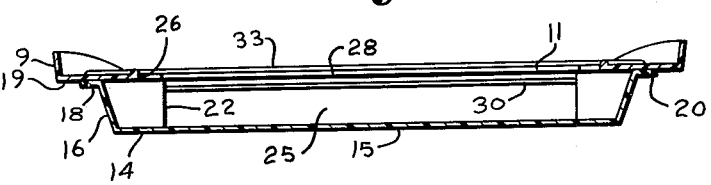
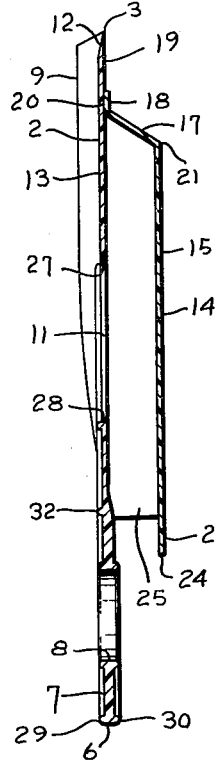
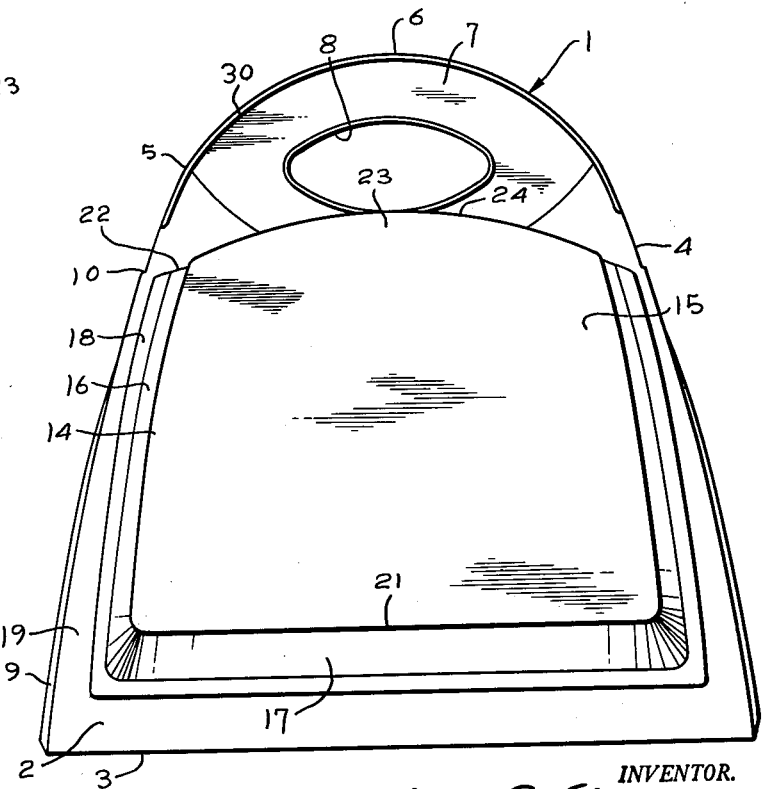
INVENTOR.
MINNIE S. CLOUGH
BY
Fishburn & Gold
ATTORNEYS

United States Patent Office 3,056,992
Patented Oct. 9, 1962

3,056,992
DUST PAN
Minnie S. Clough, 5325 W. 72nd St., Prairie Village, Kans.
Filed Jan. 2, 1962, Ser. No. 163,929
6 Claims. (Cl. 15—257.3)

This invention relates to dust pans, and more particularly to a dust pan and receptacle structure for receiving and holding dust and particles swept up from a floor or other surface.

The principal objects of the present invention are to provide a dust pan and receptacle structure arranged to permit convenient sweeping of dust particles and the like onto the pan and into the receptacle to retain the sweepings without danger of spilling while carrying the dust pan and its contents to a place of discharge and to allow ready dumping of the accumulated sweepings whenever it is desired to do so; to provide such a dust pan that is attractive in appearance and having an open receptacle shaped to receive and hold dust and particles without danger of spilling during normal handling of the dust pan; and to provide a dust pan and receptacle structure which is simple in construction, economical to manufacture and is durable and efficient for the purpose for which it is intended.

Other objects and advantages of this invention will become apparent from the following description taken in connection with the accompanying drawings wherein are set forth by way of illustration and example certain embodiments of this invention.

FIG. 1 is a perspective view of a dust pan constructed in accordance with the invention.

FIG. 2 is a sectional view through the dust pan in sweeping position.

FIG. 3 is a sectional view through the dust pan in carrying position.

FIG. 4 is a sectional view through the dust pan in dust-dumping position.

FIG. 5 is a transverse sectional view through the dust pan, taken on the line 5—5, FIG. 1.

FIG. 6 is a bottom view of the dust pan.

Referring more in detail to the drawings:

The reference numeral 1 generally designates a dust pan and receptacle structure having a relatively flat body 2 with a wide forward edge 3. Side edges 4 of the body are preferably curved and generally converge rearwardly toward the rear with said side edges merging as at 5 into an arcuate rear edge 6. A suitable handle structure 7 is provided in the body and, in the illustrated structure, said body has an ovate opening 8 therein with its longer dimension extending transversely of the body and preferably substantially on a line intersecting the merging points 5 of the side edges 4 and rear edge 6, whereby the portion of the body rearwardly of the opening forms the handle 7, the opening being a hand hold for convenience of manipulating the pan and also forming a hanger for hanging same during storage.

Side walls 9 are arranged at the side edges of the body and extend upwardly and slightly outwardly relative thereto, said side walls extending from the forward edge 3 and terminating as at 10 rearwardly of a dust passage or aperture 11 in the body and arranged as later described. The forward edge of the body is beveled as at 12 to form an inclined surface that inclines forwardly and downwardly from the upper surface 13 of said body to form a thin edge at the forward edge 3.

A receptacle 14 is provided on the bottom of the body and preferably consists of a flat bottom wall 15, upwardly extending side walls 16 and an upwardly and forwardly inclined forward wall 17 with the forward and side walls being suitably secured to the body 2. In the structure illustrated, the forward and side walls 17 and 16 of the receptacle terminate in outwardly extending flanges 18 which engage the under surface 19 of the body in inwardly spaced relation from the side edges 4 and forward edge 3 of the body. The dust pan and receptacle structure is particularly adapted for molding of suitable plastic, such as polyethylene, polypropylene and the like, that are relatively unbreakable from normal shock, and the flanges 18 are preferably adhered to the under surface 19 of the body by means of suitable adhesive or by heat sealing to provide a closed joint as at 20 between the receptacle and said body. It has been found that a suitable structure is provided wherein the height of the receptacle from the bottom wall thereof to the body is in the nature of 1-inch, and the spacing of the forward edge 21 of the receptacle bottom is preferably in the nature of 2-inches from the forward edge 3 of the body whereby, when the forward edge 21 of the bottom wall 15 of the receptacle and the forward edge 3 of the body member engage a surface to be swept, the body is inclined upwardly from said surface in the nature of 20-degrees.

The sides 16 of the receptacle curve and converge rearwardly and terminate as at 22 substantially adjacent the rear end portion 10 of the side walls on the body, and the bottom wall 15 of the receptacle has a rear portion 23 that has a preferably arcuate edge 24 extending in a curve substantially from the rear ends 22 of the receptacle side walls with the rearmost portion of said bottom wall being centrally located and approximately at the forward extremity of the hand hold opening 8 in the body. The body and the rear portions of the receptacle bottom and side walls define a rear opening 25 for dumping contents from the receptacle. The dust passage aperture 11 opens through the body to the receptacle and is preferably an elongate opening with side edges 26 spaced slightly inwardly from the side walls 16 of the receptacle and with the forward and rear edges 27 and 28 respectively of the dust passage aperture being substantially equally spaced from the forward end of the receptacle and the rearmost point of the bottom wall of the receptacle. In the structure illustrated, the width or spacing between the forward edge and rearward edge of the dust passage aperture is in the nature of one-third the length of the receptacle from the forward end thereof to the rearmost extremity of the receptacle bottom wall.

It is preferred that the rearmost portion of the body in an area surrounding the hand hold opening 8 be thicker than the forward portion of the body to provide strength. Also, it is preferred that the body be provided with small upstanding and depending ribs 29 and 30 along the side edges 4 of the body rearwardly of the side walls 9, the rear edge 6, around the edge of the hand hold opening, and that the upper surface of the body be provided with upstanding generally radiant ribs 31 from the hand hold opening with those ribs that extend forwardly terminating at an arcuate rib 32 that is forwardly of the hand hold opening and substantially on the same curvature as the rear edge 6 of the body. In the structure illustrated, there is also a rib 33 extending upwardly from the upper face of the body from the side walls 9 thereon adjacent the rear of the dust passage opening, said rib 33 curving rearwardly and contacting the rib 32. These ribs provide decorative characteristics and also some reinforcing to resist stress in the handling of the dust pan.

In using a dust pan and receptacle structure constructed as described, the handle portion 7 is grasped and the forward portion of the bottom of the receptacle 14 positioned on the floor or surface to be swept and the rear of the pan then raised to tilt the pan until the forward edge 3 of the body is in a position closely engaging the floor or surface to be swept. Dust and particles are then swept upwardly on the upper surface 13 of the body 2 to the dust passage aperture 11 where the dust and particles fall into the receptacle that is on the under side of the body and larger than said aperture 11 and, due to the inclined relationship of the pan and the bottom wall 15 of the receptacle 14, such dust and particles slide forwardly in the receptacle whereby they are retained without danger of being blown therefrom by air currents, drafts and the like. After the sweeping is completed, the handle is further elevated and is grasped whereby the pan hangs in a vertical position with the dust in the forward portion of the receptacle 14, as illustrated in FIG. 3. With the pan in this position, it may be carried from the room into a place of disposal. When it is desired to dump the accumulated sweepings from the receptacle, the pan is tilted whereby the forward edge 3 swings upwardly with the body uppermost, the elevating being continued until the dust and particles in the receptacle 14 will slide rearwardly on the upper surface of the bottom wall and be discharged from the rear opening 25 of the receptacle. The rear portion of the receptacle is narrower than the forward portion whereby the rear opening 25 of the receptacle is such that dust and particles being dumped from the receptacle are easily directed into a disposal place with little likelihood of spilling.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A dust pan and receptacle structure comprising,
   (a) a flat body having a forward edge and side edges curving and converging rearwardly therefrom,
   (b) upstanding side walls at the side edges of the body,
   (c) a handle portion at the rear of said body,
   (d) said body having an elongate opening extending thereacross and terminating in spaced relation to the side walls thereof,
   (e) a receptacle disposed on the under side of said body beneath said opening and being of a size larger than the opening and extending substantially forwardly and rearwardly of the opening,
   (f) said receptacle having a bottom wall substantially parallel to said body whereby when the body is inclined and dust swept thereon dust will pass through the opening and collect in the receptacle forwardly of said elongate opening,
   (g) said receptacle having an unobstructed open rear end for discharge of receptacle contents in response to upward tilting of the forward portion of the body.

2. A dust pan and receptacle structure as defined in claim 1 wherein,
   (a) said body has a hand hold in the rear portion thereof and the handle portion is an arcuate extension formed by said hand hold,
   (b) and opposed upstanding and depending ribs at extremities of the hand hold and extension.

3. A dust pan and receptacle structure comprising,
   (a) a flat body having a forward edge and side edges extending rearwardly therefrom,
   (b) upstanding side walls at the side edges of the body,
   (c) a handle portion on said body, and
   (d) a receptacle having a bottom wall with upwardly extending forward and side walls secured to the under side of the body whereby said receptacle bottom wall is spaced from said body,
   (e) said receptacle forward wall being spaced rearwardly from the forward edge of the body whereby said body is inclined relative to a floor to be swept when the receptacle bottom and forward edge are engaged with the surface,
   (f) said receptacle having an open rear end adjacent said handle portion,
   (g) body having an elongate opening extending thereacross and terminating in spaced relation to said receptacle side walls and providing communication with the receptacle in spaced relation to forward and rearward extremities thereof whereby dust swept onto the body member will pass through said opening into the receptacle and collect therein forwardly of said elongate opening.

4. A dust pan and receptacle structure comprising,
   (a) a flat body having a forward edge and side edges curving and converging rearwardly therefrom,
   (b) upstanding side walls at the side edges of the body,
   (c) a handle portion on said body rearwardly of said side walls, and
   (d) a receptacle having a bottom wall substantially parallel with said body with forward and side walls extending upwardly from said bottom wall and secured to the under side of the body whereby said receptacle bottom wall is spaced from said body,
   (e) said receptacle forward wall being spaced rearwardly from the forward edge of the body whereby said body is inclined relative to a floor to be swept when the receptacle bottom and forward edge are engaged with the surface,
   (f) said receptacle having a rear unobstructed opening defined by the body adjacent said handle portion and rear ends of the bottom wall and side walls of the receptacles,
   (g) said body having an opening extending thereacross and terminating in inwardly spaced relation to said receptacle side walls and providing communication with the receptacle in spaced relation to forward and rearward extremities thereof whereby dust swept onto the body member will pass through said opening into the receptacle and collect in the forward portion of the receptacle and upward tilting of the forward portion of the body discharges said dust through the rear opening of the receptacle.

5. A dust pan and receptacle structure as defined in claim 4 wherein,
   (a) the receptacle side walls are spaced inwardly from the side edges of the body and curve and converge rearwardly terminating in an open rear end of a lesser width than the forward portion of said receptacle.

6. A dust pan and receptacle structures as defined in claim 4 wherein,
   (a) said body has a hand hold in the rear portion thereof and the handle portion is an arcuate extension formed by said hand hold.

References Cited in the file of this patent
UNITED STATES PATENTS

| 720,761 | Wade | Feb. 17, 1903 |
| 2,651,924 | Lawrence | Sept. 15, 1953 |

FOREIGN PATENTS

| 507,186 | France | Sept. 7, 1920 |